United States Patent [19]

Hosaka et al.

[11] Patent Number: 4,603,179
[45] Date of Patent: Jul. 29, 1986

[54] TEMPERATURE SENSITIVE POLYMER COMPOSITIONS

[75] Inventors: Tomiharu Hosaka, Kyoto; Yoshio Kishimoto; Wataru Shimotsuma, both of Osaka, all of Japan

[73] Assignee: Matsushita Electric Industrial Co., Ltd., Japan

[21] Appl. No.: 745,631

[22] Filed: Jun. 17, 1985

[30] Foreign Application Priority Data

Jun. 15, 1984 [JP]  Japan ............................. 59-123045

[51] Int. Cl.⁴ ............................................. C08L 77/00
[52] U.S. Cl. .................................. 525/429; 525/432
[58] Field of Search ................. 525/429, 504, 432

[56] References Cited

U.S. PATENT DOCUMENTS 3,899,462  8/1975  Newbould et al. ............. 525/429 X
3,901,952  8/1975  Kishimoto et al. ................. 525/429

FOREIGN PATENT DOCUMENTS 0037640  11/1979  Japan .

Primary Examiner—Theodore E. Pertilla
Attorney, Agent, or Firm—Lowe, Price, LeBlanc, Becker & Shur

[57] ABSTRACT

A temperature sensitive polymer composition comprising a polyamide matrix and a mixture of a phenolic compound, which has an alkyl group having from 11 to 36 carbon atoms, and an aldehyde polycondensate of a phenolic compound.

10 Claims, 1 Drawing Figure

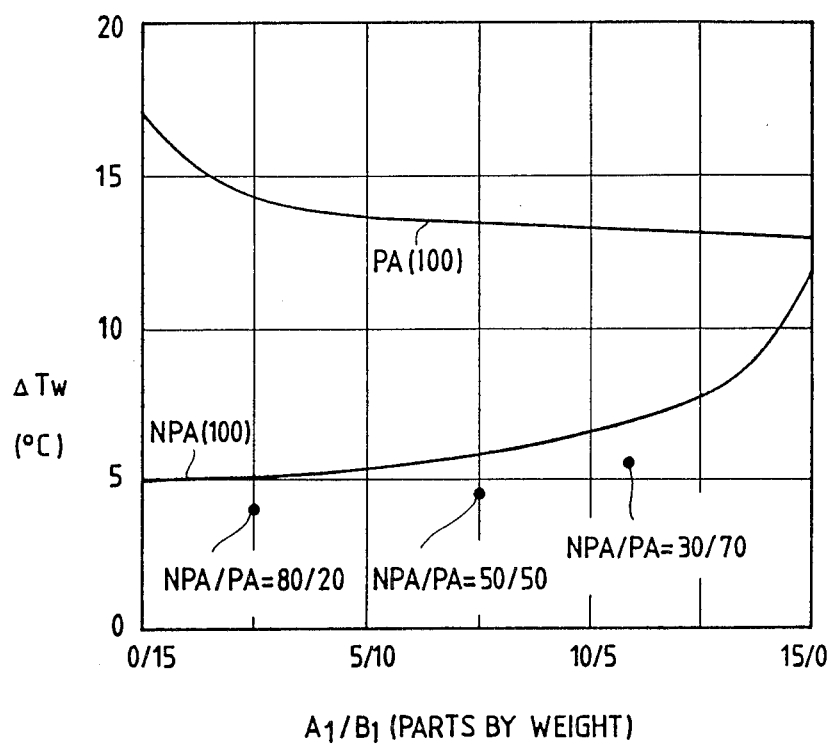

ion are known. For instance, Japanese Patent Publication Nos. 51-30958, 51-41237 and 53-117 disclose temperature sensitive compositions comprising mixtures of polyamide resins and phenolic compounds.
TEMPERATURE SENSITIVE POLYMER COMPOSITIONS

BACKGROUND OF THE INVENTION

1. Field of the Invention

This invention relates to temperature sensitive polymer compositions which are used in flexible temperature or heat sensors for use in electric heaters.

2. Description of the Prior Art

Temperature sensitive polymer materials are generally used in the form of a sheet, which is provided between a pair of wound electrodes to form a flexible, temperature sensor or thermosensitive heater. The polymer materials ordinarily used for these purposes are specific types of polyamide compositions whose electrostatic capacitance, resistance or impedance varies depending on the temperature. This characteristic variation is utilized for temperature sensing.

The temperature sensitive polymer materials should generally satisfy the following requirements.

(1) Good temperature detection sensitivity.
(2) Rapid melting when heated to temperatures exceeding the melting point to serve as a fuse.
(3) undergoing little change, in relation to time, of electric characteristics by the action of ion polarization when a DC electric field is applied.
(4) Suffering little influence of humidity.

Known temperature sensitive polyamide compositions meet requirements (1) and (2) in most instances. As for requirement (3), a number of factors greatly influence on the variation of electric characteristics. For instance, aside from the molecular structure of stabilizer used in the composition, the types of additives and/or the molecular weight of polyamide, the construction of a temperature sensitive device, i.e. a temperature sensor or a heat sensitive heater, and the application conditions of electric field show great influences. Requirement (4) is dependent largely on the characteristic properties of a temperature sensitive material and is not satisfied by the polyamide compositions presently used. This is because even nylon 11 and nylon 12, which have less moisture absorption than the other polyamide resins, are greatly influenced by humidity. A number of resin compositions which are improved in moisture absorption are known. For instance, Japanese Patent Publication Nos. 51-30958, 51-41237 and 53-117 disclose temperature sensitive compositions comprising mixtures of polyamide resins and phenolic compounds.

On the other hand, modified polyamide resins have been proposed for use as temperature sensitive materials, including polyamide resins containing N-alkyl-substituted amido units such as described in Japanese Patent Publication No. 57-59603 and Japanese Laid-open Patent Application No. 55-128203. Moreover, Japanese Laid-open Patent Application Nos. 57-206001 and 58-136624 describe polyester-amide resins, and Japanese Laid-open Patent Application Nos. 55-145756 and 55-145757 describe polyether-ester-amide resins.

Phenolic compounds which are mixed with polyamide resins must be high molecular weight compounds, which are low in heat loss, in order to satisfy the heat resistance requirement of the composition. High molecular weight phenolic compounds may be divided into two classes. One class includes compounds having high molecular weight groups, typical of which is a long chain alkyl group, and the other class includes polycondensates of phenolic compounds and aldehydes. The long chain alkyl group of the phenolic compounds should have not less than 11 carbon atoms in order to ensure a small heat loss. Phenolic compounds having a longer-chain alkyl group become less compatible with polyamide, with an attendant bleedout problem. On the other hand, aldehyde polycondensates are polymeric materials and tend to tangle with polyamide, so that they are unlikely to bleed out. However, phenol molecules are combined through methylene linkage, so that the portion including the phenolic hydroxyl group, which serves as a functional group, becomes so bulky that it is hindered from coordination with a highly crystalline amido group. This leads to the tendency toward a lowering of moisture resistance.

Polyamide resins containing N-alkyl-substituted amido units are disadvantageous in that when the degree of substitution of the N-alkyl group is increased, the melting point may lower to below 100° C. Since the degree of substitution cannot thus be increased for use as temperature sensitive materials, it is difficult to suppress the variation of electric characteristics, such as electric resistance and/or impedance, caused by moisture absorption.

Resins having ester groups, such as polyesteramide resins or polyether-ester-amide resins, have a poor resistance to hydrolysis. In addition, in order to perform the fusing function as required for temperature sensitive polymer materials, the content of the amido groups in the resins is unable to be made so small and a great humidity resistance cannot be obtained.

SUMMARY OF THE INVENTION

It is an object of the invention to provide a temperature sensitive polymer composition which has a very small variation of electric characteristics depending on the humidity.

It is another object of the invention to provide a temperature sensitive polymer composition whose electric characteristics can be appropriately controlled as desired.

The temperature sensitive polymer composition according to the invention comprises a polyamide matrix dispersing a mixture of a phenolic compound (A), which has an alkyl group having from 11 to 36 carbon atoms, and a polycondensate (B) of a phenolic compound and an aldehyde. The mixture is generally present in the composition in an amount of from 5 to 30 parts by weight per 100 parts by weight of the polyamide matrix. The mixing ratio of the phenolic compound having a long chain alkyl group to the polycondensate is in the range of 1:5 to 5:1. In short, the present invention is characterized by the combination of the long chain alkyl group-bearing phenolic compound (A) and the polycondensate (B), by which miscibility between the phenolic compound (A) and a polyamide resin is improved by the action of the polycondensate, which is readily miscible with the phenolic compound.

BRIEF DESCRIPTION OF THE DRAWING

A sole FIGURE is a graph showing the relation between humidity resistance, expressed by ΔT defined hereinafter, and ratio of a long chain alkyl group-bearing phenolic compound and a polycondensate of a phenolic compound and an aldehyde.

DETAILED DESCRIPTION AND EMBODIMENTS OF THE INVENTION

The phenolic compounds (A) should have a long alkyl group having from 11 to 36 carbon atoms in order to permit good moisture resistance and the low heat loss. Of the alkyl groups, dodecyl, stearyl and pentacosyl are preferred. Examples of phenolic compounds (A) include esters such as alkyl hydroxybenzoates, alkyl dihydroxybenzoates, alkyl gallates and the like, alkylphenols such as dodecylphenol, stearylphenol and pentacosylphenol, and the like.

The aldehyde polycondensates (B) of phenolic compounds are obtained by polycondensation between aldehydes and phenolic compounds. Examples of the phenolic compounds include alkyl hydroxybenzoates, halogenated phenols and alkylphenols. The hydroxybenzoates may be o, m and phydroxybenzoates and have an alkyl group having from 6 to 18 carbon atoms. Examples of the alkyl groups in the alkyphenols have from 4 to 12 carbon atoms, and include bùtyl, pentyl, hexyl, heptyl, octyl, nonyl, decyl, undecyl dodecyl, tridecyl and tetradecyl. Examples of halogenated phenol include monochlorophenol, dichlorophenol, monobromophenol, and the like. Of these phenolic compounds, alkyl hydroxybenzoates, in which the alkyl group is butyl, hexyl or octyl, are preferred. Polycondensates of these phenolic compounds with aldehydes are readily formed under conditions known to the art. The resulting polycondensates are thermoplastic, in which the phenol groups are left unreacted.

The aldehydes used for the polycondensation may be, for example, formaldehyde, acetaldehyde, benzaldehyde and the like, of which formaldehyde is preferred because of the ready availability and inexpensiveness.

The phenolic compound (A) and the polycondensate (B) are mixed in a mixing ratio by weight of 5:1 to 1:5, within which good compatibility with polyamide, good moisture or humidity resistance and good flexibility are ensured. The mixture of (A) and (B) is present in a polymer matrix in an amount of from 5 to 30 parts by weight per 100 parts by weight of the polymer matrix. Amounts less than 5 parts are not effective, whereas amounts larger than 30 parts impede the properties of the matrix.

The polymer matrices used in the present invention are polyamide resins and include, for example, crystalline polyamide resins such as polyundecaneamide, polydodecaneamide and the like, and modified polyamide resins of low crystallinity such as a polyamide resin having N-alkyl-substituted amido units, a polyamide resin having ether units and the like. These polyamide resins may be used singly or in combination of two or more. Preferably, mixtures of the polyamide resins of high crystallinity and the modified polyamide resins of low crystallinity are used because of the much reduced variation of electric characteristics depending on the humidity. In addition, the mixture does not bring about a considerable lowering of the melting point.

The modified polyamide resins are described in more detail.

The N-alkyl-substituted amido units are of the following formula

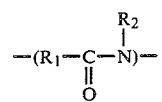

in which $R_1$ represents an alkylene group having from 5 to 35, and $R_2$ represents an alkyl group having from 1 to 18 carbon atoms. The alkylene group is preferably a decamethylene group or an undecamethylene group although any other alkylene groups having from 5 to 35 carbon atoms may be used. The alkyl group represented by $R_2$ preferably include an ethyl group, a propyl group, a butyl group, a pentyl group, a hexyl group, a heptyl group, and an octyl group. The degree of substitution of the N-alkyl group is generally from 120 to 35 mole % in order to ensure the substitution effect.

The polyamide resin having ether amido units is typically represented by the following formula

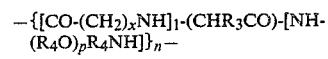

in which X represents an integer of 10 or 11, $R_3$ represents an alkylene group having from 3 to 11 carbon atoms, $R_4$ represents an alkylene group having from 2 to 6 carbon atoms, and 1, p and n are independently an integer of 1 or over. In the ether units of the above formula, the oxyalkylene component has a polyoxyalkylene structure and is preferably polyoxyethylene, polyoxypropylene or polyoxybutylene.

Moreover, a dimer acid-containing polyamide resin may also be used. The dimer acid used may be an acid which is obtained by the Diels-Alder reaction between lenoleic acid and a conjugated isomer thereof nad has 36 carbon atoms. This dimer acid is commercially available under the name of "Macromelt" from Henkel Hakusui Co., Ltd. The polyamide resin having the dimer acid units has low crystallinity and low moisture absorption.

The N-alkyl substituted amido, ether or dimer acid units in the polyamide resin is generally present in an amount of from 10 to 90 wt %.

N-alkyl-substituted amido, ether or dimer acid units may be incorporated in block, random, alternating or grafting form. Of these, there are preferred random or almost random or block copolymers, which are composed of the N-alkyl-substituted amido units, ether units or dimer acid units and undecaneamido or dodecaneamido units, because of the low crystallinity.

These modified polyamide resins may be used, as a polymer matrix of the temperature sensitive polymer composition of the invention, as they are, or by mixing with polyundecaneamide, polydodecaneamide or a mixture thereof, as set forth before. If mixed, the modified polyamide resin is used in amounts from 10 to 90 wt % with the balance of the crystalline polyamide resin, e.g. polyundecaneamide, polydodecaneamide or a mixture thereof.

The temperature sensitive polymer composition of the invention has a remarkable humidity resistance. The reason for this is considered as follows.

The effect of the combination of the phenolic materials (A) and (B) is considered to be attributed to the structures of the respective materials. The phenolic compound (A) has a long chain structure, and the polycondensate (B) is miscible with both phenolic compound (A) and polyamide and has a bulky structure.

When the phenolic materials (A) and (B) are mixed with polyamide, the polycondensate (B) serves to prevent bleedout of the phenolic compound (A). In the polymer matrix, the molecules of (A) and (B) are entangled with each other and tend to coordinate to the amido groups. Thus, the polyamide matrix becomes resistant to moisture.

The effect of suppressing a variation of electric characteristics by the use of a mixture of a crystalline polyamide resin and a modified polyamide resin having low crystallinity is considered as follows.

In crystalline polyamide resins such as nylon 6, 610, 11 and 12, phenolic compound (A) is more readily dispersable than polycondensate (B) which has a bulky structure. In contrast, the polycondensate (B) is more miscible with the modified polyamide resins having low crystallinity and is more likely to act thereon. Thus, the effect of the combination of the phenolic materials (A) and (B) on the mixture of the two types of polyamide resins becomes more pronounced than in the case where only one type of polyamide is used.

The present invention is more particularly described by way of examples.

EXAMPLES 1 THROUGH 10 AND COMPARATIVE EXAMPLES 1 THROUGH 5

Polyundecaneamide, polydodecaneamide (hereinafter sometimes abbreviated as PA), 30% N-heptyl-substituted polyundecaneamide (hereinafter sometimes abbreviated as NPA) and mixtures thereof were used as they are, or by mixing with phenolic compound (A) and formaldehyde polycondensates (B) of phenolic compounds in amounts indicated in Tables 1 and 2.

Each sample was made by mixing phenolic materials (A) and (B) in a polymer matrix. The mixture was then kneaded and pelletized in an extruder, followed by hot pressing to form an about 10 cm × 10 cm sheet having a thickness of 1 mm. The sheet was applied with a silver paint on opposite sides to form silver electrodes. The sample was subjected to measurements of a humidity resistance, $\Delta Tw$, and a thermistor constant, $B_z$. The humidity resistance was evaluated as a temperature difference between a thermistor characteristic of the dried sheet and a thermistor characteristic of the sheet which had been saturated with moisture at a relative humidity of 87%. The thermistor constant $B_z$ was a thermistor B constant which was determined from impedance values at 30° C. and 60° C. The results of the test are shown in Tables 1 and 2 below along with a melting point of each resin or composition.

TABLE 1

| | Composition (parts by weight) | | | $\Delta Tw$ (°C.) | $B_z$ (K) | Melting Point (°C.) |
|---|---|---|---|---|---|---|
| | Polymer Matrix | Phenolic Compound | Polycondensate | | | |
| Comparative Example: | | | | | | |
| 1 | polydodecaneamide (100) | stearyl p-hydroxybenzoate (15) | — | 13 | 4000 | 173 |
| 2 | polydodecaneamide (100) | — | polycondensate of actyl p-hydroxybenzoate/formaldehyde (15) | 17 | 3700 | 176 |
| 3 | polyundecaneamide (100) | dodecyl p-hydroxybenzoate (15) | — | 14 | 3800 | 182 |
| 4 | 30% N—heptyl-substituted polyundecaneamide (100) | — | — | 18 | 2200 | 161 |
| 5 | polyundecaneamide (50) + 30% N—heptyl-substituted polyundecaneamide (50) | — | — | 22 | 2300 | 175 |

TABLE 2

| | Composition (parts by weight) | | | $\Delta Tw$ (°C.) | $B_z$ (K) | Melting Point (°C.) |
|---|---|---|---|---|---|---|
| | Polymer Matrix | Phenolic Compound | Polycondensate | | | |
| Example: | | | | | | |
| 1 | polydodecaneamide(30) + 30% N—heptyl-substituted polyundecaneamide (70) | p-dodecylphenol (5) | polycondensate of octyl p-hydroxybenzoate/formaldehyde (10) | 4.5 | 3400 | 158 |
| 2 | polydodecaneamide(30) + 30% N—heptyl-substituted polyundecaneamide (70) | stearyl 3,4-dioxybenzoate (5) | polycondensate of octyl p-hydroxybenzoate/formaldehyde (10) | 4.5 | 4700 | 160 |
| 3 | polydodecaneamide(30) + 30% N—heptyl-substituted polyundecaneamide (70) | stearyl gallate (8) | polycondensate of octyl p-hydroxybenzoate/formaldehyde (15) | 4 | 4500 | 155 |
| 4 | polydodecaneamide(30) + 30% N—heptyl-substituted polyundecane- | pentacosyl p-hydroxybenzoate | polycondensate of octyl p-hydroxyben- | 4.5 | 3500 | 157 |

TABLE 2-continued

| | Composition (parts by weight) | | | ΔTw (°C.) | Bz (K) | Melting Point (°C.) |
|---|---|---|---|---|---|---|
| | Polymer Matrix | Phenolic Compound | Polycondensate | | | |
| | amide (70) | | zoate/formaldehyde (10) | | | |
| 5 | polyundecaneamide(50) + 30% N—heptyl-substituted polyundecaneamide (50) | dodecyl p-hydroxybenzoate (7.5) | polycondensate of p-chlorophenol/formaldehyde (7.5) | 5.5 | 3600 | 162 |
| 6 | polyether-amide having dodecaneamido units (100) | stearyl p-hydroxybenzoate (5) | polycondensate of octyl p-hydroxybenzoate/formaldehyde (10) | 8 | 4100 | 153 |
| 7 | polydodecaneamide(50) + polyether-amide having dodecaneamide units (50) | dodecyl p-hydroxybenzoate (12) | polycondensate of p-octylphenol/formaldehyde (12) | 6 | 3600 | 166 |
| 8 | polydodecaneamide(50) + polyether-amide having dodecaneamide units (50) | dodecyl p-hydroxybenzoate (7.5) | polycondensate of butyl p-hydroxybenzoate (7.5) | 6.5 | 3700 | 167 |
| 9 | polydodecaneamide(70) polyether-amide having dodecaneamide units (30) | stearyl p-hydroxybenzoate (15) | polycondensate of Hexyl p-hydroxybenzoate and formaldehyde (8) | 7.5 | 3600 | 172 |
| 10 | polydodecaneamide(50) + dimer acid-containing polyamide (50) units (30) | stearyl p-hydroxybenzoate (7.5) | polycondensate of hexyl p-hydroxybenzoate and formaldehyde (7.5) | 6 | 3500 | 156 |

Moreover, the humidity resistance of polydodecaneamide, 30% N-heptyl-substituted polyundecaneamide, and mixtures thereof with or without being mixed with stearyl p-hydroxybenzoate ($A_1$) and a polycondensate of octyl p-hydroxybenzoate and formaldehyde in a total amount of 15 parts by weight per 100 parts by weight of the polyamide, is also shown in the sole figure.

As will be seen from the tables and the figure, when polydodecaneamide is used singly as the polymer matrix, the humidity resistance decreases with an increasing ratio of stearyl p-hydroxybenzoate $A_1$. When the ratio, $A_1/B_1$, reaches about 1:5, the resistance becomes almost constant. However, in a range where $A_1/B_1$ is too large, the p-hydroxybenzoate, $A_1$, bleeds out. When the ratio, $A_1/B_1$, is in the range of from 1:5 to 5:1, the humidity resistance, ΔTw, is small without involving any bleedout problem.

On the other hand, when 30% N-heptyl-substituted polyundecaneamide is used singly as the polymer matrix, the humidity resistance sharply decreases with an increasing ratio of the aldehyde polycondensate $B_1$ as is different from the case of polydodecaneamide. At the ratio, $A_1/B_1$, of below about 5:1, the variation of ΔTw becomes slight, ensuring good humidity resistance.

In the figure, black points indicate the cases where two types of polyamide resins are used in combination in different amounts, revealing that the humidity resistance of these combinations is superior to the humidity resistance achieved by the single use of each polyamide resin.

What is claimed is:

1. A temperature sensitive polymer composition comprising a polyamide matrix and a mixture of a phenolic compound (A), which has an alkyl group having from 11 to 36 carbon atoms, and a polycondensate (B) of a phenolic compound and an aldehyde, said mixture being present in an amount of from 5 to 30 parts by weight per 100 parts by weight of said polyamide matrix.

2. A temperature sensitive polymer composition according to claim 1, wherein said polyamide matrix is at least one member selected from the group consisting of polyundecaneamide, polydodecaneamide and modified polyamide resins.

3. A temperature sensitive polymer composition according to claim 1, wherein said polyamide matrix is a mixture of a crystalline polyamide resin and a modified polyamide resin of low crystallinity.

4. A temperature sensitive polymer composition according to claim 3, wherein said crystalline polyamide is selected from the group consisting of polyundecaneamide, polydodecaneamide and a mixture thereof, and said modified polyamide resin is a polyamide resin containing units selected from the group consisting of N-alkylsubstituted amido units, ether units, dimer acid units and mixtures thereof.

5. A temperature sensitive polymer composition according to claim 1, wherein said phenolic compound (A) is at least one member selected from the group consisting of alkyl hydroxybenzoates, alkyl dihydroxybenzoates, alkyl gallates and alkylphenols, in which the alkyl group has from 11 to 36 carbon atoms.

6. A temperature sensitive polymer composition according to claim 5, wherein the alkyl group is dodecyl, stearyl or pentacosyl.

7. A temperature sensitive polymer composition according to claim 1, wherein said polycondensate (B) is at least one member selected from the group consisting of formaldehyde polycondensates of alkyl hydroxybenzoates, halogenated phenols and alkylphenols.

8. A temperature sensitive polymer composition according to claim 7, wherein said polycondensate is a polycondensate of formaldehyde and an alkyl hydroxybenzoate.

9. A temperature sensitive polymer composition according to claim 8, wherein said alkyl hydroxybenzoate is butyl, hexyl or octyl hydroxybenzoate.

10. A temperature sensitive polymer composition according to claim 1, wherein the ratio of the phenolic compound (A) and the polycondensate (B) is in the range of 1:5 to 5:1.

* * * * *